Patented May 22, 1951

2,553,816

UNITED STATES PATENT OFFICE 2,553,816

PRESSURE-SENSITIVE ADHESIVE AND ADHESIVE TAPE

Clarence Joseph Ebel, St. Paul, Minn., assignor to Minnesota Mining & Manufacturing Company, St. Paul, Minn., a corporation of Delaware No Drawing. Application February 16, 1948, Serial No. 8,752

10 Claims. (Cl. 117—122)

The present application is a continuation-in-part of my copending application Serial No. 589,277, filed April 19, 1945, now abandoned.

This invention relates to eucohesive adhesives which are normally tacky and pressure-sensitive, and to pressure-sensitive adhesive tapes made therefrom. In particular, the invention is concerned with adhesives, of the type described, having a saturated oxygen-containing synthetic rubbery vinyl polymer base. These adhesives can be coated on cloth, paper or non-fibrous film backings, for example, to provide highly effective pressure-sensitive adhesive sheets and tapes which have been found useful in the arts of painting and lacquering, package sealing, mending of books and records, and the like. The tapes are aggressively and stably tacky and instantly adhere upon contact to most surfaces, without need of activation by moistening or heating.

By "eucohesive" it is meant that the tacky adhesive mass is more cohesive than adhesive such that offsetting or transfer of adhesive material does not result when a sheet or tape coated therewith is unwound from rolls or removed from surfaces to which temporarily applied, and that such coated sheet or tape can be handled without transfer of adhesive material to the fingers.

Many vinyl polymers, such for example as polymerized vinyl acetate, have been found useful in adhesive compositions for application from solution or dispersion. The adhesive dries to a hard, firm and non-tacky state, and may usually be reactivated by heat or solvents. These hard polymers have been used as permanent cementing layers between various types of surfaces, but have not been found suitable for the preparation of normally tacky and eucohesive pressure-sensitive adhesives.

Other vinyl polymers, and specifically, the rubbery polymers obtained by the polymerization of vinyl monomers having longer side chains, are softer than the polymers having shorter side chains, such as the polymers of vinyl acetate, methyl acrylate, methyl methacrylate, etc. Some of these softer polymers have been found to be normally tacky, and hence have been suggested as adhesive coatings for normally tacky and pressure-sensitive adhesive tapes.

However, the normally tacky vinyl polymers have not given complete satisfaction when tested as pressure-sensitive adhesives. For example, the vinyl polymers are in many cases low in adhesion, so that the resulting coated tape does not adhere with sufficient tenacity to surfaces to which applied. The addition of tackifiers such as rosin, various derivatives of rosin such as ester gum or hydrogenated rosin, terpene resins, etc., improves the adhesion but at the same time softens the composition so that it is no longer sufficiently eucohesive. Other vinyl polymers have been found to be eucohesive and sufficiently tacky at room temperature, but are temporarily, and sometimes permanently, softened and weakened excessively on moderate heating.

These and other deficiencies of the specific class of polymers here involved, with respect to their usefulness as normally tacky and pressure-sensitive adhesives, are overcome by my invention. I provide new adhesive compositions, as hereinafter more fully defined and identified, having superior qualities for use in masking tape, mending tape, electrical insulating tape, and other forms of coated normally tacky and pressure-sensitive adhesive tapes.

I utilize oxygen-containing synthetic rubbery vinyl polymer base materials of the class consisting of polymers of esters of acrylic acid, esters of vinyl alcohol, and ethers of vinyl alcohol; having saturated terminal side chains of at least four carbon atoms with each of such terminal side chains linked to a single carbon atom through a single oxygen atom. The polymer can be a copolymer of the specified monomer and a minor proportion of another polymerizable monomer serving as a modifier. An illustration of such polymer is a copolymer of 75 parts of 2-ethylbutyl acrylate and 25 parts of ethyl acrylate. An illustration of a polymer of an ester of vinyl alcohol is polyvinyl butyrate. An illustration of a polymer of an ether of vinyl alcohol is polyvinyl-n-butyl-ether.

I obtain my novel product and result by adding to the saturated oxygen-containing synthetic rubbery vinyl polymer adhesive base material a compatible oil-soluble heat-and-oil-reactive phenol-aldehyde resin, as illustrated in the following examples.

EXAMPLE 1

| | Parts by weight |
|---|---|
| Rubbery acrylate copolymer | 100 |
| Titanium dioxide pigment | 5 |
| Phenol-aldehyde resin | 5 |
| Ester gum | 10 |
| Zinc resinate | 1 |
| Heptane | 300 |
| Ethyl alcohol | 6 |

The vinlyl polymer used in this example was prepared from 75 parts of 2-ethylbutyl acrylate and 25 parts of ethyl acrylate, copolymerized in aqueous dispersion and coagulated with alum;

the final washed and dried polymer was of about the consistency of lightly milled crude crepe rubber. Coagulation with barium chloride has provided a slightly more soluble and more tacky polymer, which, however, was difficult to obtain free of chlorides for use in making chloride-free adhesive tapes.

The phenol-aldehyde resin of the above formula was prepared from approximately two mols of formaldehyde and one mol of para-tertiary-amylphenol, using an alkaline catalyst, according to the procedure given below. It may be classified as an unmodified oil-soluble alkaline-condensed heat-and-oil-reactive phenol-aldehyde resin. It was compatible with the vinyl polymer.

The polymer, pigment, and rosin derivative resins were mixed together in a steam-jacketed heavy-duty internal mixer until smooth; the phenol-aldehyde resin was then added and mixing continued without heating for 30 minutes, after which 80 lbs. steam was applied in the jacket of the mixer for two hours. The temperature of the batch during this period was of the order of 140–150° C. Cooling to below the boiling point of the solvent, and dilution with heptane followed by addition of the alcohol to reduce the viscosity of the final solution, completed the preparation of the adhesive. The solution had a final viscosity of 5000–7000 centipoises at 80° F., and was satisfactorily coated on various backings, including cloth backings, to produce tacky and adherent but firm and long-aging pressure-sensitive adhesive sheets and tapes.

When this same acrylate copolymer was used without the phenol-aldehyde resin for the production of pressure-sensitive adhesives, it was necessary to reduce the amount of rosin type tackifier resins, or even to eliminate them entirely, in order to prevent splitting of the adhesive layer on unwinding of the roll or removal of the tape from surfaces to which it had been applied; and this was particularly true where the tape was to be used at slightly elevated temperatures. Elimination of the resins resulted in an adhesive, and therefore an adhesive tape or sheet, having much reduced tackiness or adhesion value under normal conditions of use. The treated product of the present example, on the other hand, is satisfactorily eucohesive even at well above room temperatures, and furthermore has ample tackiness over a wide range of conditions and for a wide variety of uses.

As above prepared, the adhesive is already in its final eucohesive state when applied to the backing. By a variation of the method of procedure given, it is possible to coat the adhesive prior to heating, and later to convert it to the eucohesive state when in the coated sheet form. For example, in the preparation of the adhesive of the present example, the batch in the internal mixer may be kept cool, by passing cooling water continuously through the mixer jacket, during the entire mixing and dissolving cycle. Alternatively, the pigment may be milled into the polymer on a rubber mill, and the milled base, together with the resinous ingredients, then dissolved and blended in the mixed solvents by means of a paddle type mixer. The adhesive is then coated on a suitable heat-resistant backing; the solvent is removed by evaporation; the coated sheet is wound up in roll form; and the roll is heated in an oven for 2 hours at 300° F. On comparing such tape with the unheated product, and also with a similarly heated product in which the phenol-aldehyde resin was omitted, the following comparative test values were obtained; in this specific instance, the backing used was a cellulose acetate cloth.

|  | Adhesion | Cohesion at— | |
|---|---|---|---|
|  |  | 75° F. | 110° F. |
| Without phenolic resin, heated in roll form | (¹) | (¹) | (¹) |
| With phenolic resin but not heated | 12–14 | 63–70 | 15–17 |
| With phenolic resin, heated in roll form | 11–12 | 121–137 | 25–29 |

¹ Roll could not be unwound, the adhesive had softened on heating and had flowed into the cloth, cementing the adjacent layers together In a variation of this procedure, the coated sheet may be dried in an oven and heated further in sheet form by electrical or by direct heat radiation; the finished sheet is then slit into desired width and wound up in roll form.

The phenol-aldehyde resin used in Example 1 is representative of a well-known class of phenolic resins designed initially for use with drying oils in the varnish-making industry, and there characterized as oil-soluble and heat-and-oil-active phenol-aldehyde resins. Oil solubility, and apparently also compatibility with the vinyl polymers of the present invention, is obtained by the use of substituted phenols such as para-tertiary-amyl phenol, para-tertiary-butyl phenol, and para-phenyl phenol. Formaldehyde is ordinarily preferred as the aldehyde constituent, and is present in an amount substantially in excess of equimolecular proportion as compared to the phenol. The resin is in partially reacted state, and is ordinarily employed in the form of hard, brittle lumps.

The specific phenolic resin of Example 1 was produced as follows:

*Formula*

| | Pounds |
|---|---|
| Formaldehyde (37% solution) | 1300 |
| Sodium hydroxide solution (130 parts sod. hydroxide in 200 parts water) | 330 |
| Para-tertiary-amyl-phenol | 1345 |

*Procedure*

Mix the sodium hydroxide solution with the formaldehyde solution; cool; add the para-tertiary-amyl-phenol, and react with gentle heating until the free formaldehyde content of the batch is reduced to not more than 1% by analysis. Add dilute sulfuric acid to a pH of 1–2, at which point the resin separates from the aqueous phase. Draw off the aqueous phase, and wash the fluid resin with several changes of hot water, then heat under vacuum until a test drop of the resin forms a brittle pill on cooling to room temperature. Cool rapidly to room temperature, to obtain a brittle resinous product having a temporary melting-point of the order of 180–190° F. Break the resin into lumps for storage or use.

EXAMPLE 2

| | Parts by weight |
|---|---|
| Cross-linked polyvinyl butyrate | 84 |
| Phenol-aldehyde resin (as in Example 1) | 4.2 |
| Zinc resinate | 2.5 |
| Solvent as required. | |

For the synthetic rubbery vinyl, 425 parts of monomeric vinyl butyrate and 2.13 parts of diisoamyl ethylene dimaleate (prepared from ethylene glycol, maleic anhydride, and isoamyl alcohol by two-stage esterification) were copolymerized in solution in 425 parts of tertiary butyl alcohol, using benzoyl peroxide as the catalyst, and reacting for 23 hours at about 75–78° C. The reaction was stopped when the percentage of volatile constituents in the solution, tested at 100° C., had been reduced by polymerization of the reactants to 56.2%. The volatile portion was removed by evaporation, and the polymer was milled on a rubber-mill together with the phenol-aldehyde resin (prepared as for Example 1) and the zinc resinate. During the milling, the mixture was heated by heating the mill rolls with steam at 80–90 p. s. i. for about 45 minutes, which resulted in a pronounced stiffening of the mass. It was then dissolved in sufficient "Amsco AX" solvent, a volatile hydrocarbon solvent having a high aromatic content, to produce a 20% solution.

The compounded polymer adhesive, in the form of the solution prepared as above, was coated on cellophane and the resulting transparent coated tape was tested against tapes similarly prepared in which the polymer alone constituted the adhesive coating. The crude polymer could be used as a pressure-sensitive eucohesive adhesive for some purposes but was low in adhesion value and in internal strength. Addition of the zinc resinate and phenol-formaldehyde resin by simple solution and without heating increased the tackiness but greatly reduced the internal strength of the adhesive. Heating, as carried out in the present example, caused a firming or an increase in internal strength of the adhesive without seriously reducing its ability to adhere to various surfaces when applied thereto under light pressure.

EXAMPLE 3

Polyvinyl normal butyl ether _____ 100
"Bakelite BR-14634" _____ 7.5
Pale "Zitro" resin _____ 4
Toluol _____ 450

The polymerized vinyl-n-butyl-ether, a rather firm rubbery polymer obtained in the form of beads, was milled for five minutes; the "Bakelite" and "Zitro" resins were then added on the mill, which was then heated with steam at 80 p. s. i. in the rolls, and mixing was continued for 40 minutes. The mass was then removed from the mill, dissolved in the toluol by simple agitation, and spread on cellophane to provide a heat-resistant, tacky, eucohesive pressure-sensitive sheet.

The same type of polyvinyl normal butyl ether by itself provides an adhesive coating of rather low adhesion value which exhibits a certain degree of usefulness at normal room temperature but which softens excessively when subjected to elevated temperatures, for example up to 300° F. The mixture of polymer, "Bakelite" resin, and zinc resinate as above prepared is higher in adhesion value, and in addition is highly resistant to the softening effect of high temperature. For example, at 300° F. the polymer alone became too soft to test further after only one hour, while the above adhesive was not measurably softened at 6 hours and was still usefully firm after 24 hours of heating.

"Bakelite BR-14634" is a commercial resin, available at the date of this application, which is an oil-soluble heat-and-oil-reactive phenol-aldehyde resin, compatible with the vinyl polymer. It is understood to be a para-tertiary-butyl-phenol formaldehyde resin made with an alkaline catalyst and with more than one mol, i. e., between 1.5 and 2.0 mols, of formaldehyde for each mol of substituted phenol.

The "Zitro" resin is a commercially available pale zinc resinate containing 4.8% combined zinc and having a low acid number not greater than about 15.

In place of the hydrocarbon solvents of Examples 1–3, I may use any other volatile liquid solvent, e. g. carbon tetrachloride, in which the several components may be adequately dissolved or dispersed to a smooth, stable, spreadable form. Alternatively, I may coat my adhesives in the form of aqueous dispersions, prepared either by dispersing the completed adhesive or by mixing aqueous dispersions of polymer, resins, etc. The mixture is coated and dried, and the dried residue is then heated in situ.

The ester gum of Example 1 serves to increase the tackiness or adhesion value of the adhesive composition. The ester gum may be omitted and yet the adhesive will be adequately tacky for some purposes. The proportion may be increased to 16 parts, or even higher proportions, of ester gum or other tackifiers or mixtures thereof in addition to the phenol-aldehyde resin. For example, one formula which has replaced that of Example 1 where a transparent and somewhat more tacky adhesive was required, was prepared from 100 parts of the rubbery acrylate copolymer, 5 parts of "BR-14634" resin, one part of "Zitro" resin, and 15 parts of "Piccolite S-25," a pure hydrocarbon thermoplastic terpene resin having a melting point of 25° C.

Instead of the 100% phenol-aldehyde resins of the examples, phenol-aldehyde resins formed in the presence of certain modifying agents, and particularly of modifying agents such as rosin or the like, are found to be useful in combination with my vinyl polymer base adhesives to provide homogeneous products having increased tackiness as well as improved firmness and other properties. When used in equivalent amounts based on the phenolic resin content, such modified resins are therefore to be considered as fully equivalent to the unmodified resins described above. One such modified resin which is useful both as a tackifier and in imparting a desirable degree of internal strength or eucohesiveness to the soft vinyl polymer base may be made, for example, by heating rosin (abietic acid) with an equal weight of a neutral water-insoluble but still liquid resinous material formed by the partial reaction, in the presence of an alkaline catalyst, of one mol of phenol, four mols of para tertiary butyl phenol, and ten mols of formaldehyde. Heating is controlled so as to provide a homogeneous, hard and brittle resinous product which is still compatible with the rubbery polymer employed.

The rubbery saturated oxygen-containing vinyl polymers of the examples will be seen to have, in each case, relatively long side chains attached to individual carbon atoms of the carbon skeleton. These side chains in each case contain at least four carbon atoms, in addition to an oxygen atom.

The specific vinyl polymers herein illustrated have provided excellent tacky and pressure-sensitive adhesives when used in conjunction with specific amounts of specific phenol-aldehyde resins as stated in the examples. Other equivalent modifications of such polymers and resins, and other procedures, may require considerable variation from the proportions given. In most cases, the amount of oil-soluble heat-and-oil-reactive phenol-aldehyde resin will fall within the approximate limits of 2–15 parts by weight of the resin to 100 parts of the synthetic oxygen-containing saturated rubbery vinyl polymer.

With the smaller proportions of phenol-aldehyde resin, it is found desirable to include small amounts of an activator or catalyst, so as to decrease the time and temperature of heating. Zinc resinate is an example of such an activator which is also a tackifier. Zinc oxide is highly effective as an activator; when both zinc oxide and rosin are present in the composition, zinc resinate is formed. Calcium oxide or hydroxide, and calcium resinate, are less effective but still useful activators. With larger proportions of phenol-aldehyde resin, the addition of activators becomes of less importance. However, I prefer to include small amounts of zinc resinate or equivalent as indicated in the Examples.

These and other variables will be readily controlled, in accordance with the teachings of my invention, so as to provide normally tacky and pressure-sensitive adhesive compositions in which a tacky synthetic rubbery oxygen-containing saturated vinyl polymer base adhesive is improved in internal strength and in heat-resistance by blending and heating with a minor proportion of a compatible, oil-soluble, heat-and-oil-reactive phenol-aldehyde resin. There is provided a new adhesive product having improved properties.

Having described various illustrative embodiments of my invention, but without intent to be limited thereto, what I claim is as follows:

1. An adhesive composition comprised of a major proportion of a synthetic rubbery polymer of the class consisting of polymers of esters of acrylic acid, esters of vinyl alcohol, and ethers of vinyl alcohol, having saturated terminal side chains of at least four carbon atoms with each of such terminal side chains linked to a single carbon atom through a single oxygen atom, a minor proportion of a compatible, oil-soluble, heat-and-oil-reactive phenol-aldehyde resin, and a minor proportion of resinous tackifier including zinc resinate; said adhesive composition being normally tacky and pressure-sensitive when in a solvent-free dried state.

2. An adhesive composition which in the dry state is a normally tacky and pressure-sensitive eucohesive adhesive adapted for use in pressure-sensitive adhesive tape, comprising a heated blend of: (1) 100 parts of a synthetic rubbery polymer of the class consisting of polymers of esters of acrylic acid, esters of vinyl alcohol, and ethers of vinyl alcohol, having saturated terminal side chains of at least four carbon atoms with each of such terminal side chains linked to a single carbon atom through a single oxygen atom; (2) about 2–15 parts of a compatible, oil-soluble, heat-and-oil-reactive phenol-aldehyde resin; and (3) a compatible tackifier resin in an amount up to about 16 parts; said heated blend being firmer and more heat-resistant than the same blend unheated.

3. An adhesive composition according to claim 2 wherein the synthetic rubbery polymer is an acrylate ester polymer.

4. An adhesive composition according to claim 3 wherein the polymer is a copolymer of three parts 2-ethylbutyl acrylate and one part ethyl acrylate.

5. Pressure-sensitive adhesive tape comprising a flexible backing member carrying a coating of an adhesive according to claim 1.

6. Pressure-sensitive adhesive tape comprising a flexible backing member carrying a coating of an adhesive according to claim 2.

7. Pressure-sensitive adhesive tape comprising a flexible backing member carrying a coating of an adhesive according to claim 3.

8. Pressure-sensitive adhesive tape comprising a flexible backing member carrying a coating of an adhesive according to claim 4.

9. A pressure-sensitive adhesive tape wound upon itself in roll form, comprising a flexible backing and, as a coating thereon, a normally tacky and pressure-sensitive adhesive composition comprised of a major proportion of a synthetic rubbery polymer of the class consisting of polymers of esters of acrylic acid, esters of vinyl alcohol, and ethers of vinyl alcohol, having saturated terminal side chains of at least four carbon atoms with each of such terminal side chains linked to a single carbon atom through an oxygen atom, and a minor proportion of a compatible, oil-soluble, heat-and-oil-reactive phenol-aldehyde resin.

10. A pressure-sensitive adhesive tape wound upon itself in roll form, comprising a flexible backing and, as a coating thereon, a normally tacky and pressure-sensitive adhesive composition comprised of a heated blend of a major proportion of a synthetic rubbery polymer of the class consisting of polymers of esters of acrylic acid, esters of vinyl alcohol, and ethers of vinyl alcohol, having saturated terminal side chains of at least four carbon atoms with each of such terminal side chains linked to a single carbon atom through an oxygen atom, and a minor proportion of a compatible, oil-soluble, heat-and-oil-reactive phenol-aldehyde resin, said heated blend being firmer and more heat-resistant than the same blend unheated.

CLARENCE JOSEPH EBEL.

REFERENCES CITED

The following references are of record in the file of this patent:

UNITED STATES PATENTS

| Number | Name | Date |
|---|---|---|
| 2,336,792 | Langkammerer et al. | Dec. 14, 1943 |
| 2,396,098 | Haas | Mar. 5, 1946 |
| 2,410,053 | Drew | Oct. 29, 1946 |
| 2,415,901 | Nelson | Feb. 18, 1947 |
| 2,442,018 | Quarles | May 25, 1948 |

FOREIGN PATENTS

| Number | Country | Date |
|---|---|---|
| 705,329 | Germany | Apr. 29, 1941 |
| 117,787 | Australia | Dec. 2, 1943 |

OTHER REFERENCES

Strain et al.: Ind. & Eng. Chem., April 1939, pp. 382, 383.

Rothrock: Canadian Chem. and Process Industries, Sept. 1944, pp. 599 and 600.

Wakeman: The Chemistry of Commercial Plastics, Reinhold, 1947, pp. 470 and 471.